(12) United States Patent
Rovelli et al.

(10) Patent No.: US 12,468,455 B2
(45) Date of Patent: Nov. 11, 2025

(54) CONTROLLER FOR REGULATING AND SECURING ACCESS TO ONE TIME PROGRAMMABLE (OTP) MEMORY

(71) Applicant: Micron Technology, Inc., Boise, ID (US)

(72) Inventors: Angelo Alberto Rovelli, Agrate Brianza (IT); Federica Cresci, Milan (IT)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 18/527,990

(22) Filed: Dec. 4, 2023

(65) Prior Publication Data

US 2024/0184457 A1 Jun. 6, 2024

Related U.S. Application Data

(60) Provisional application No. 63/430,093, filed on Dec. 5, 2022.

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| | | | |
|---|---|---|---|
| 2006/0069870 A1* | 3/2006 | Nicholson | G06F 1/30 711/E12.04 |
| 2022/0027464 A1* | 1/2022 | Regner | G06F 21/554 |
| 2023/0071555 A1* | 3/2023 | Ogawa | G06F 21/79 |

* cited by examiner

*Primary Examiner* — Jane W Benner
(74) *Attorney, Agent, or Firm* — Brooks, Cameron & Huebsch, PLLC (57) ABSTRACT

An access controller can be provided to regulate and secure access to an intermediate memory to which data stored in a one-time-programmable (OTP) memory can be copied. To secure the access of the intermediate memory, the access controller can regulate a frequency at which the intermediate memory can be accessed and cryptographically manage (e.g., encrypt and/or decrypt) data being read from and/or written to the intermediate memory.

18 Claims, 6 Drawing Sheets

CONTROLLER FOR REGULATING AND SECURING ACCESS TO ONE TIME PROGRAMMABLE (OTP) MEMORY

PRIORITY INFORMATION

This application claims the benefit of U.S. Provisional Application No. 63/430,093, filed on Dec. 5, 2022, the contents of which are incorporated herein by reference.

TECHNICAL FIELD

The present disclosure relates generally to semiconductor memory and methods, and more particularly, to apparatuses, systems, and methods for a controller for regulating and securing access to memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to a controller for regulating and securing access to memory are described. The computing system can include a one-time-programmable memory (OTP). An OTP can refer to a particular type of non-volatile memory (NVM) that permits data to be written to memory only once. Once the memory has been programmed, it retains its value upon loss of power (e.g., is non-volatile). An OTP memory can be used in applications where reliable and repeatable reading of critical (e.g., sensitive) data is required. The critical data can refer to data required to ensures secure operations of the computing system and can include firmware, bootloaders, boot code, cryptographic keys (e.g., encryption keys), and configuration parameters for analog, sensor, or display circuitry. OTP NVM can be characterized, over other types of NVM like electronic fuse (eFuse) or electrically-erasable programmable read only memory (EEPROM), by offering a low power, small area footprint memory structure.

The data can be copied from the OTP to a memory (e.g., SRAM), which is mapped to different system resources, such as host processors, direct memory access (DMA) engines, etc. such that the data can be accessed from the intermediate memory instead of the OTP. By having a separate memory (other than the OTP) from which data can be accessed, the OTP can be protected from being accessed undesirably frequently and from being damaged due to the frequent accesses. However, this separate memory can be vulnerable to attacks (e.g., routed from those system resources). Furthermore, data stored in the memory (e.g., having a copy of the data stored in the OTP) can be undesirably stolen via various means, such as X-ray reading or micro-probing on data buses via which data are exchanged with the intermediate memory.

In various embodiments, an access controller is provided to ensure secure access to the OTP as well as to a memory storing a copy of the data stored in the OTP. The access controller can ensure that a data transfer request is executed only when it's foreseen. For example, if a size and/or address of data indicated by the request does not match to a size and/or address of data stored in the intermediate memory, the access controller may discard the request and not execute. Further, the access controller can regulate a frequency at which the intermediate memory is accessed to make sure that the intermediate memory is not access for more than a threshold number of times over a particular amount of time. In some embodiments, the access controller can permanently prevent access to a particular location of the intermediate memory.

Further, a host (e.g., system resources) that tries to access the intermediate memory can be mapped to a local memory within the access controller (rather than to the intermediate memory) that can discriminate between different system resources (e.g., indicate whether a request is routed from host processors, or DMA engine, etc.) and provide a degree of security based on the discrimination capability. The access controller can further operate the intermediate memory with data security schemes to encrypt data prior to writing the data to the intermediate memory such that the data are stored in the intermediate memory in a cypher text form, which does not expose contents of the data merely due to attacks being capable of reading data form the intermediate memory (e.g., via X-ray reading).

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 344-1, . . . , 344-X in FIG. 3. Such analogous elements may be generally referenced without the hyphen and extra numeral or letter. For example, elements 344-1, . . . , 344-X may be collectively referenced as 344. As used herein, the designators "X", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
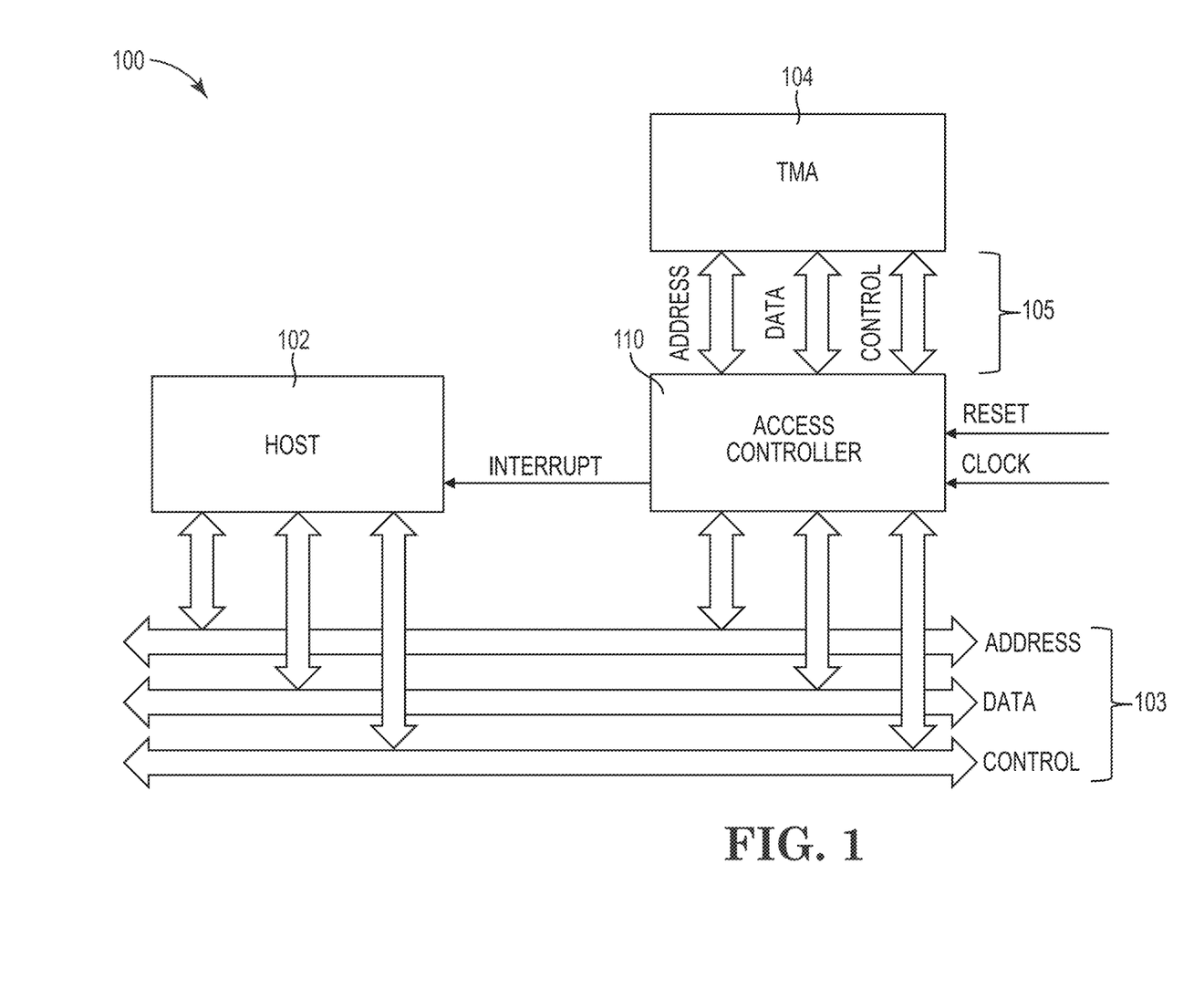
FIG. 1 is a block diagram of a computing system including a host, a target memory array (TMA), and an access controller in accordance with a number of embodiments of the present disclosure.

FIG. 1 is a block diagram of a computing system 100 including a host 102, a target memory array (TMA)) 104, and an access controller (alternatively referred to as "target memory access controller" (TMAC)) 110 in accordance with a number of embodiments of the present disclosure. As used herein, a host 102, a TMA 104, and an access controller 110 might also be separately considered an "apparatus."

The computing system 100 can be a host system (or one or more of such host systems) coupled to various types of interfaces, such as a peripheral component interconnect (PCI) interface, a peripheral component interconnect express (PCIe) interface (e.g., PCIe 5.0 interface compliant with the compute express link (CXL) protocol standard), a serial advanced technology attachment (SATA) interface, and/or a miniature serial advanced technology attachment (mSATA) interface, among others. In some embodiments, the interface can include a flexible bus interconnect and can use CXL protocol layers including CXL.io and CXL.mem and can support transfer speeds of at least 32 gigatransfers per second. In some embodiments, the computing system 100 can include and/or be coupled to a solid state drive (SSD) system.

The host 102 can be a host processor, such as a central processing unit (CPU) or a host engine, such as a direct memory access (DMA) engine, although embodiments are not so limited. One of ordinary skill in the art will appreciate that "a processor" can intend one or more processors, such as a parallel processing system, a number of coprocessors, etc. In general, the host 102 can include a complex instruction set architecture and can be configured to execute instructions corresponding to an operating system for the computing system 100.

The host 102 can be coupled to the access controller 110 via an interface 103. In some embodiments, the interface 103 can be an advanced extensible interface (AXI) interface. The interface 103 can include an address line, a data line, and a control line for transferring address, data, and control signals, respectively, between the host 102 and the access controller 110. In some embodiments, the access controller 110 can assert an interrupt signal to the host 102 via the interface 103. The interrupt signal can be indicative of an abnormal status of a memory operation performed and/or being performed on a local memory (e.g., local memory array (LMA) 224 illustrated in FIG. 2) and/or the TMA 104. Stated alternatively, the interrupt signal can be generated and asserted to the host 102 when one or more conditions that would necessitate an abort of the memory operation are met. The interrupt signal can be further indicative of a successful completion of processing memory commands (alternatively referred to as "data transfer requests" (DTRs)).

In some embodiments, various external signals can be provided to the access controller 110 (e.g., via the interface 103 or a different interface not shown in FIG. 1). Non-limiting examples of these signals can include a reset signal (to reset the access controller 110), an (e.g., external) clock signal, etc.

The access controller 110 can be further coupled to the TMA 104 via an interface 105. In some embodiments, the interface 105 can be a SRAM interface. The interface 105 can include an address line, a data line, and a control line for transferring address, data, and control signals, respectively, between the access controller 110 and the TMA 104.

The TMA 104 can be a one-time-programmable (OTP) memory. The OTP memory can refer to a particular type of non-volatile memory (NVM) that permits data to be written to memory only once. Once the memory has been programmed, it retains its value upon loss of power (e.g., is non-volatile). Examples can include boot code, encryption keys, and configuration parameters for analog, sensor, or display circuitry. OTP NVM is characterized, over other types of NVM like electronic fuse (eFuse) or electrically-erasable programmable read only memory (EEPROM), by offering a low power, small area footprint memory structure.

Figure 2:
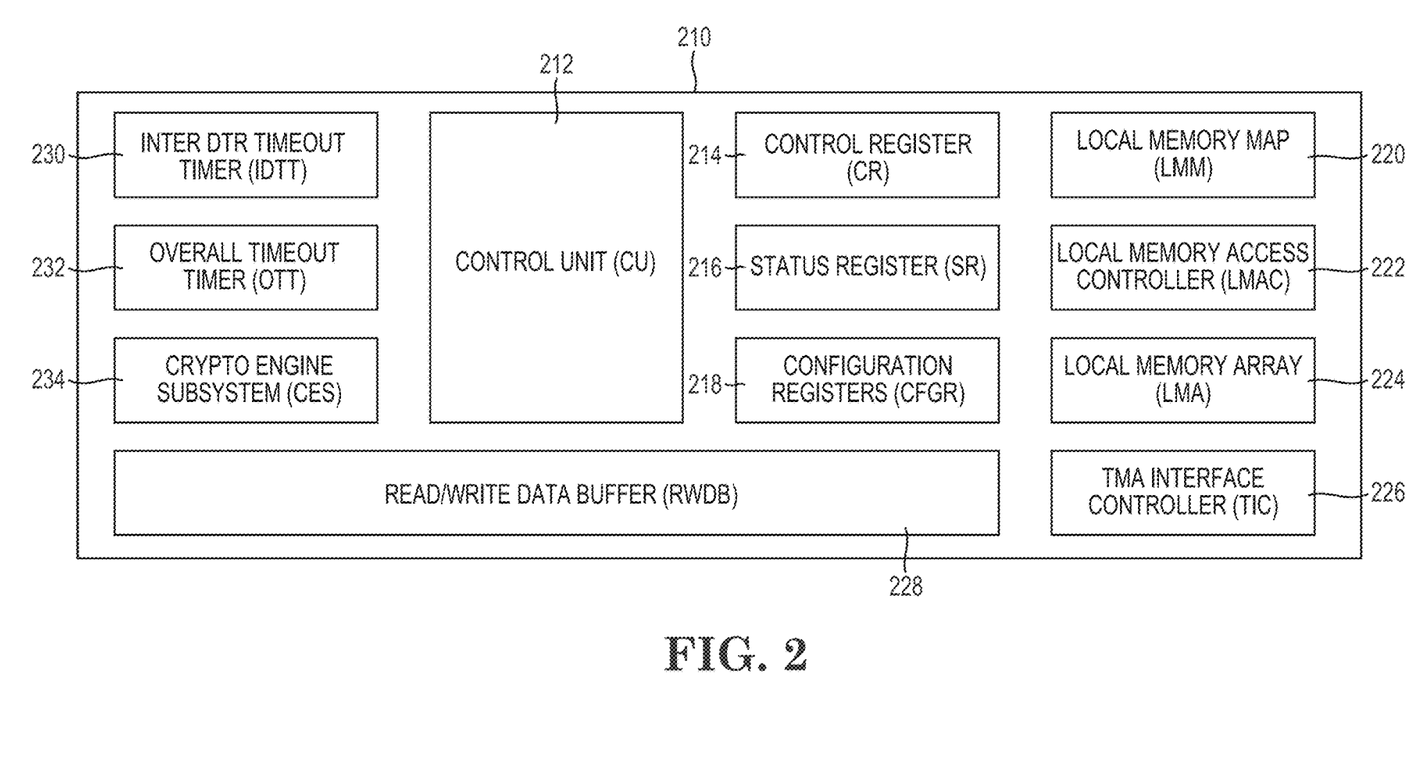
FIG. 2 is a block diagram of an access controller in accordance with a number of embodiments of the present disclosure.

As further illustrated herein, the access controller 110 can include a local memory (e.g., local memory array (LMA) 224 illustrated in FIG. 2) that can include data copied from the TMA 104. Both TMA 104 and the local memory (e.g., LMA 224 illustrated in FIG. 2) are not mapped to the address space of the host 102. The host 102 can identify how many commands it would need to issue to the access controller 110 for each host access transaction (e.g., host read or write transaction) based on mapping information that is constructed based on the local memory of the access controller 110.

As used herein, the term "host read transaction" (alternatively referred to as "read transaction") refers to a transaction involving one or more read operations (alternatively referred to as "read accesses") on a memory (e.g., the local memory of the access controller 110, such as the LMA 224 illustrated in FIG. 2). Further, as used herein, the term "host write transaction" (alternatively referred to as "write transaction") refers to a transaction involving one or more write operations (alternatively referred to as "write accesses") on a memory (e.g., the local memory of the access controller 110, such as the LMA 224 illustrated in FIG. 2).

Figure 3:
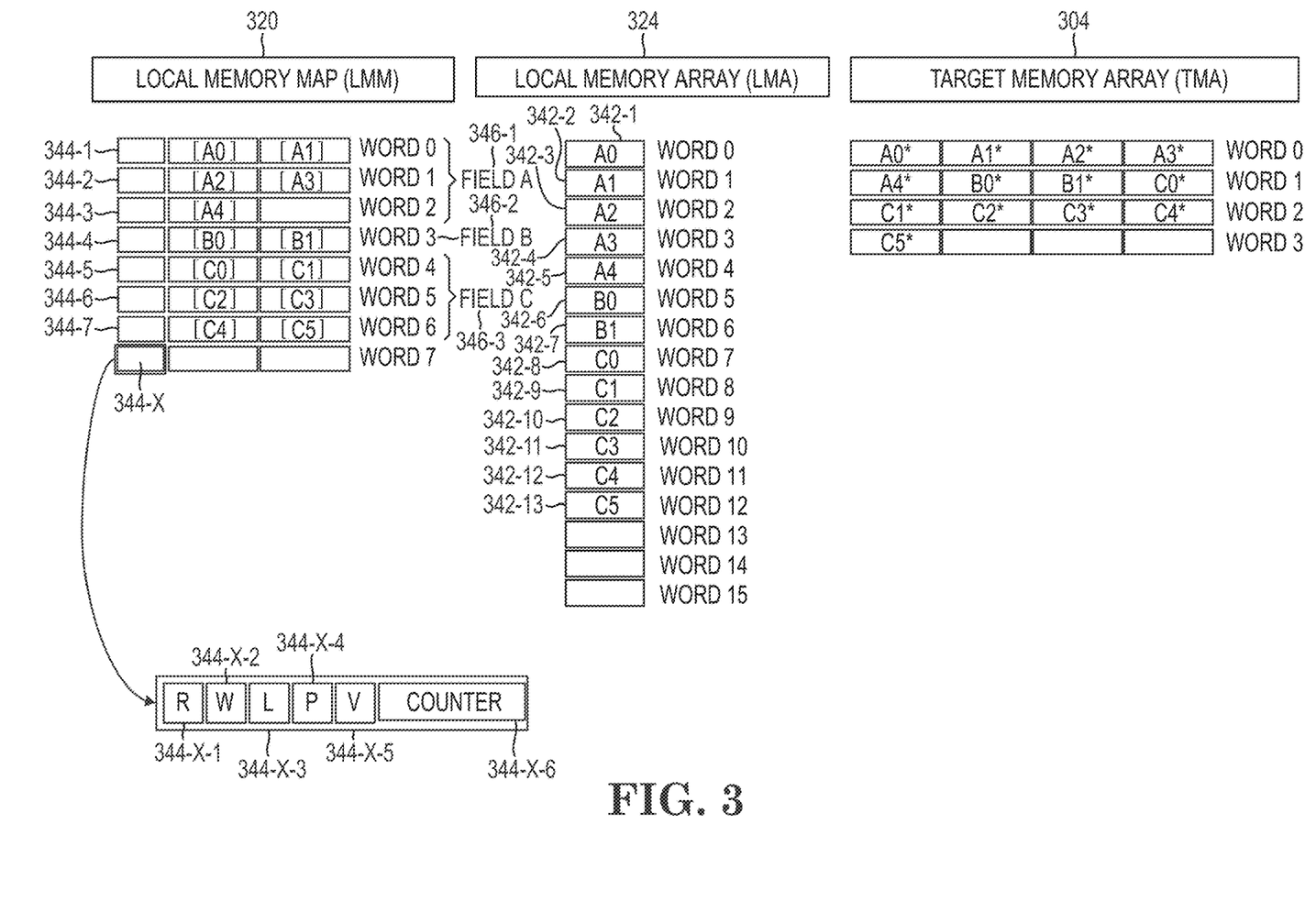
FIG. 3 illustrates data that are organized as words respectively in various memories in accordance with a number of embodiments of the present disclosure.

The local memory of the access controller 110 can include segments (e.g., respectively corresponding to data subsets 342 illustrated in FIG. 3) that can individually be a unit of a memory (e.g., read or write) operation. For example, if the host access (e.g., read or write) transaction involves accessing three segments of the local memory of the access controller 110, the host 102 can issue three commands for performing three memory operations respectively on the segments.

The access controller 110 can perform various operations as described herein, which can include accessing the TMA 104 on behalf of the host 102 in a secure manner. For example, as further described herein, the access controller 110 can include an encryption/decryption engine (e.g., the crypto engine subsystem 234 illustrated in FIG. 2) to store data in the TMA 104 in an encrypted version (e.g., cypher text form) and decrypt the data read from the TMA 104 to make the data available to the host 102 in an unencrypted/decrypted version (e.g., plain text form). Further, the access controller 110 can access the TMA 104 according to a particular (e.g., predetermined) policy that is designed to reduce a frequency at which the intermediate memory 104 is accessed. For example, the access controller 110 can allow access of the TMA 104 only when the access controller 110 is reset and/or only for a particular (e.g., predetermined) number of times.

FIG. 2 is a block diagram of an access controller 210 in accordance with a number of embodiments of the present disclosure. The access controller 210 can correspond to the access controller 110 illustrated in FIG. 1.

A host (e.g., the host 102 illustrated in FIG. 1) can request the access controller 210 to process a host access transaction (e.g., a host read transaction or a host write access transaction), which can involve generating and issuing a number of memory (e.g., read or write) commands (alternatively referred to as "data transfer requests" (DTR)). The host can identify a quantity and types of memory commands for each host read or write transaction and the identified memory commands can be submitted (e.g., issued) to the access controller 210 via a control register 214 of the access controller 210.

Memory commands issued by and received from the host 102 can be received at the control register 214. The control register 214 can be configured to store bits that are indicative of an address of data (e.g., word) of a local memory map (LMM) 220, a quantity of memory commands for a corresponding host access transaction, whether a host access transaction is a host write transaction or a host read transaction, and/or bits that can be used to trigger execution of a memory command and/or generation of an interrupt signal to the host associated with executing a memory command.

The access controller 210 can include a control unit 212 that can control a (e.g., one or more) local memory access controller (LMAC) 222 and a crypto engine subsystem (CES) 234. The LMAC 222 can operate in conjunction with the control unit 212 to manage memory operations (e.g., read or write operations) on a local memory array (LMA) 224.

The CES 234 can be configured to cryptographically encrypt/decrypt data being read from and/or written to the TMA (e.g., the TMA 104 illustrated in FIG. 1). For example, the CES 234 can convert data in plain text form to cypher text form to encrypt the data (prior to writing the data to the memory 104) or convert data in cypher text form to plain text form to decrypt the data (subsequent to reading the data from the memory 104). Although embodiments are not so limited, data can be cryptographically encrypted/decrypted according to an advanced encryption standard (AES) algorithm.

The LMA 224 can temporarily store data to be written to or read from the TMA. In one example, data to be written to the TMA can be stored in the LMA 224 prior to being encrypted at the CES 234. In another example, data read from the TMA and decrypted at the CES 234 can be subsequently stored in the LMA 224 prior to being transferred to the read/write data buffer (RWDB) 228 and further to the host. Therefore, data stored in the LMA 224 can be in plain text form. In some embodiments, the LMA 224 can be a volatile memory, which can be reset in response to a power cycling event (e.g., a power reset) of the access controller 210.

Copying data from the TMA to the LMA 224 can be triggered in response to various stimulus. In one example, data can be copied from the TMA to the LMA 224 as part of executing memory (e.g., read) commands. In another example, data can be automatically copied from the TMA to the LMA 224 in response to a power cycling event, such as a reset of the access controller 210.

The access controller 210 can include a local memory map (LMM) 220, which maps between the LMA 224 and the TMA and is visible to the host. As further illustrated in FIGS. 3, data corresponding to memory commands are organized as one or more "words" in the LMM 220, LMA 224, and TMA (e.g., the memory 104 illustrated in FIG. 1), and words are further organized as "fields" (e.g., in the LMM 220). Alternatively speaking, each field can include one or more words and each word can include data corresponding to one or more memory commands. As used herein, data corresponding to a field can be a unit of host access transaction. Each word as respectively organized in the LMM 220, LMA 224, and TMA may be formed differently as further illustrated in FIG. 3. For example, a word as organized in the LMM 220 can include data corresponding to memory commands of a same field, while a word as organized in the TMA includes data corresponding to memory commands that may belong to different fields. Further, in the LMA 224, each word can correspond to data corresponding to a single memory command.

For each word, the LMM 220 can set a flag (e.g., one or more flags 344 illustrated in FIG. 3) that is indicative of whether access is granted or not. For example, a flag can indicate whether a read access is granted, a write access is granted, locked (e.g., read and/or write access is temporarily denied until a subsequent power cycling event, such as a power rest of the computing system 100 illustrated in FIG. 1), or permanently locked (e.g., access is permanently denied).

For each word, the LMM 220 can further set a flag (e.g., one or more flags 344 illustrated in FIG. 3) that is indicative of whether data has been successfully decrypted at the CES 234 when transferred from the TMA to the LMA 224. When the decryption indeed indicates one or more errors (e.g., bit errors) on the word, the decryption failure can be reported to the host via a status register 216.

The LMM 220 can further include counters (e.g., the counters 344-X-6 illustrated in FIG. 3) respectively for words stored in the LMM 220. Each counter can indicate a quantity of memory (e.g., read or write) operations performed to access the respective word. For example, starting from an initial value (e.g., "0"), the counter can be incremented by 1 for each host access. The counter can be initialized (e.g., reset) to an initial value (e.g., "0") in response to an occurrence of a power cycling event involving the access controller 210. When a counter has reached a threshold (e.g., maximum) value, a host access transaction to access a word can be denied and the failure of the host access transaction can be reported to the host via the status register 216. A configuration of the LMM 220 (e.g., associated with flags, counters, etc.) can be maintained until a reset of the access controller 210. In some embodiments, the access controller 210 can be configured at the time the access controller 210 is manufactured.

The access controller 210 can further include a read/write data buffer (RWDB) 228, which can be accessible by the host. For example, data to be transferred (e.g., read) to the host (e.g., as part of execution of a host read transaction) can be stored in the RWDB 228 prior to being transferred to the host. For example, data received from the host and to be transferred (e.g., written) to the TMA (e.g., as part of execution of a host write transaction) can be transferred to the RWDB 228 prior to being written to the TMA. The RWDB 228 can be reset upon execution of a corresponding memory command is completed or upon a reset of the access controller 210.

The control unit 212 can operate in conjunction with an inter DTR timeout timer (IDTT) 230 and/or an overall timeout timer (OTT) 232 to allow no more than a threshold (e.g., predetermined) amount of time for executing one or more respective memory commands. The IDTT 230 can measure a time elapsed between two consecutive memory commands. For example, the IDTT 230 can be reset and immediately starts counting a time (e.g., a predetermined time) in response to receipt of one memory command. Alternatively, the IDTT 230 can be reset when the access controller 210 is reset. If a time being counted by the IDTT 230 exceeds the threshold prior to being reset, the IDTT 230 can abort processing a host access transaction (e.g., abort the execution of corresponding memory commands) and notify the host (e.g., via an interrupt signal) via the status register 216.

The OTT 232 can measure a time elapsed between a first memory command and a last command of a single host access transaction (e.g., RT or WT). For example, the OTT 232 can immediately starts counting a time (e.g., a predetermined time) in response to receipt of a first memory command of a single host access transaction and can be reset in response to receipt of a last memory command of the host access transaction. Alternatively, the OTT 232 can be reset when the access controller 210 is reset. If a time being counted by the OTT 232 is expired prior to being reset, the OTT 232 can notify the expiration to the control unit 212 and the control unit 212 can abort the process of a host (e.g., read and/or write) access (e.g., abort the execution of corresponding memory commands) and notify the host (e.g., via an interrupt signal).

The status register 216 can be configured to store bits that can indicate a current status of the access controller 210. For example, the bits of the status register 216 can indicate that the access controller 210 is idle (e.g., available to receive and execute another memory command) or busy (e.g., the access controller 210 is currently executing a memory command). The bits of the status register 216 can further indicate a current status of the memory command being executed/executed at the access controller 210. For example, the bits of the status register 216 can indicate that a memory command has been executed successfully ("OK"), an execution of a memory command was failed ("KO"), and no errors were discovered on data corresponding to a read command and copied to the LMA 224 ("Valid"). Optionally, the status register 216 can further indicate a quantity of memory commands involved with each host access transaction. The control unit 212 can further indicate on the status register 216 that a respective host access transaction is aborted (due to the expiration of the time counted by the IDTT 230 or OTT 232 prior to being reset) to notify the host of the abort.

The access controller 210 can include one or more configuration registers 218 configured to store one or more bits indicative of a marginal (e.g., maximum and alternatively referred to as "threshold") value for the IDTT 230, a marginal (e.g., maximum and alternatively referred to as "threshold") value for the OTT 232 value, a marginal (e.g., maximum and alternatively referred to as "threshold") quantity of memory commands allowed for a host access (e.g., read or write) transaction, and a marginal (e.g., maximum and alternatively referred to as "threshold") quantity of access allowed for each location (e.g., configured to store a word) of the LMM 220. The access controller 210 can further include an interface controller that drives interface signals (e.g., address, data, and/or control signals) for memory (e.g., read or write) operations performed as part of executing memory commands.

FIG. 3 illustrates data that are organized as words respectively in various memories (e.g., LMM 320, LMA 324, and TMA 304) in accordance with a number of embodiments of the present disclosure. The LMM 220 and LMA 224 can respectively correspond to the LMM 320 and LMA 324 illustrated in FIG. 2. Further the TMA 304 can correspond to the TMA 104 illustrated in FIG. 1.

As illustrated in herein, data corresponding to memory commands can be organized as word in the LMM 320, LMA 324, and TMA 304 differently. As used herein, the term "subset of data" or "subset" can refer to data corresponding to a single memory command.

For example, in the LMA 324, each word (e.g., words "0" to "11") can respectively correspond to each subset 342-1 ("A0" as shown in FIG. 3), 342-2 ("A1" as shown in FIG. 3), 342-3 ("A2" as shown in FIG. 3), 342-4 ("A3" as shown in FIG. 3), 342-5 ("A4" as shown in FIG. 3), 342-6 ("B0" as shown in FIG. 3), 342-7 ("B1" as shown in FIG. 3), 342-8 ("C0" as shown in FIG. 3), 342-9 ("C1" as shown in FIG. 3), 342-10 ("C2" as shown in FIG. 3), 342-11 ("C3" as shown in FIG. 3), 342-12 ("C4" as shown in FIG. 3), and 342-13 ("C5" as shown in FIG. 3).

Further, for example, in the TMA 304, a first word ("word 0") can include subsets 342-1, 342-2, 342-3, and 342-4, a second word ("word 1") can include subsets 342-5, 342-6, 342-7, and 342-8, a third word ("word 2") can include subsets 342-9, 342-10, 342-11, and 342-12, and a fourth word ("word 3") can include a subset 342-13, as illustrated in FIG. 3. Therefore, each word as organized in the TMA 304 can correspond to four words as organized in the LMA 324 in an example illustrated in FIG. 3. Although embodiments are not so limited, an example size of a TMA can correspond to 64 words as organized in TMA with each word having 32 bits.

Subsets can belong to one or more fields. For example, as illustrated in FIG. 3, the subsets 342-1, . . . , 342-5 ("A0" to "A4") can belong to a first field ("Field A"), the subsets 342-6 and 342-7 ("B0" to "B1") can belong to a second field ("Field B"), and the subsets 342-8, . . . , 342-13 ("C0" to "C5") can belong to a third field ("Field C").

The LMM 320 can be mapped to the LMA 324. For example, the LMM 320 contains mapping information indicating how the words of the LMA are organized in fields. As illustrated in FIG. 3, in the LMM 320, first three words are allocated for a first field 346-1 ("Field A"), in which a first word ("word 0") can include subsets 342-1, 342-2, a second word ("word 1") can include subsets 342-3, 342-4, and a third word ("word 2") can include subsets 342-5; a subsequent word is allocated for a second field 346-2 ("Field B"), in which a second word ("word 3") can include subsets 342-6 and 342-7; and subsequent three words are allocated for a third field 346-3 ("Field C"), in which a first word ("word 4") can include subsets 342-8 and 342-9, a second word ("word 5") can include subsets 342-10 and 342-11, a third word ("word 6") can include subsets 342-12 and 342-13.

As illustrated in FIG. 3, a word "7" of the LMM 320 does not include subsets (e.g., subsets 342), but rather include a padding. As used herein, a "padding" refers to bits that do not represent data values. A padding can be implemented in various manners. For example, a padding can be implemented in the LMM 320 by causing data values of respective subsets to indicate invalid locations, although embodiments are not so limited.

As illustrated herein, each subset 342 can be either stored in a plain text form (e.g., "A0") or in a cypher text form (e.g., "A0*"). For example, subsets 342 can be stored in cypher text form in the TMA 304 and in plain text form in the LMA 324.

The LMM 320 can further include a set of indicators (e.g., flags and/or counters) 344-1, . . . , 344-X respectively for each word (e.g., words "0" to "7"). Each set can include a flag 344-X-1 (e.g., "R" shown in FIG. 3) that indicates whether a read access is granted or not, a flag 344-X-2 (e.g., "W" shown in FIG. 3) that indicates whether a write access is granted or not, a flag 344-X-3 (e.g., "L" shown in FIG. 3) that indicates whether a respective word is locked or not (e.g., access is temporarily denied until a subsequent power cycling event, such as a power rest of the computing system 100 illustrated in FIG. 1), and a flag 344-X-4 (e.g., "P" shown in FIG. 3) that indicates whether a respective word is permanently locked or not (e.g., access is permanently denied), a flag 344-X-5 (e.g., "V" shown in FIG. 3) that indicates whether subsets corresponding to a respective word is valid or not (e.g., whether errors were detected when decrypted at the CES 234 illustrated in FIG. 2). Each set can further include a counter 344-X-6 (alternatively referred to as "access counter"), which can indicate a number of accesses (e.g., read or write accesses) from the host.

Each field having words as organized in the LMM 320 can be a unit of a host access transaction (e.g., a host read or write transaction). Since the LMM 320 is accessible and visible to the host, the host can identify a quantity of memory commands associated with processing a respective host access transaction based on mapping information provided by the LMM 320. In an example, the host can generate and issue two memory commands (e.g., read commands) for accessing a field "B" and respectively for the subsets 342-6 and 342-7 of the field "B". In response to the memory commands, the subsets 342-6 and 342-7 (that have already been decrypted at the CES 234 illustrated in FIG. 2 and stored in the LMA 324 in plain text form) can be transferred to the host from the LMA 324. As illustrated herein, words and/or subsets can be copied from the TMA to the LMA 324 at the time the access controller is reset, and not necessarily at the time memory commands are received from the host. In another example, for writing a field "C", the host can generate and issue six memory commands (e.g., write commands) for respectively writing six subsets 342-8, . . . , 342-13 of the field "C". In response to the memory commands, data corresponding to subsets 342-8, . . . , 342-13 can be written to the LMA 324 and further to the TMA 304 subsequent to being encrypted at the CES 234 illustrated in FIG. 2.

In a non-limiting example, an apparatus (e.g., the access controller 110 and/or 210 illustrated in FIGS. 1 and 2, respectively) can include a control unit (e.g., the control unit 212 illustrated in FIG. 2) communicatively coupled to a first memory (e.g., the memory 104 and/or 304 illustrated in FIGS. 1 and 3, respectively) 104, 304. The control unit 212 can be configured to regulate access of the first memory 104, 304 based on a number of memory operations performed on the first memory 104, 304 over a particular period of time and an amount of time taken for performance of one or more memory operations on the first memory 104, 304.

In some embodiments, the access controller 110, 210 can further include a cryptographic engine (e.g., the CES 234 illustrated in FIG. 2) and a second memory (e.g., the LMA 224 and/or 324 illustrated in FIGS. 2 and 3, respectively) coupled to the first memory 104, 304. The control unit 212 can be configured to transfer the data from the second memory 224, 324 to the cryptographic engine 234 to encrypt the data and write the encrypted data (e.g., in cypher text form) to the first memory 104, 304. Further, in this example, the control unit 212 can be configured to cause the first memory 104, 304 to transfer data that has been stored in the first memory 104, 304 in an encrypted version to the cryptographic engine 234 to decrypt the data. The control unit 212 can be further configured to write the decrypted data to the second memory 224, 324 to make the data available to the host 102 in an unencrypted version (e.g., in plain text form).

In some embodiments, the control unit 212 can be configured to receive a plurality of memory commands respectively corresponding to a plurality of memory operations that correspond to a host access transaction. In this example, the access controller 110, 210 can further include a timer (e.g., the IDTT 230 illustrated in FIG. 2) that indicates whether a particular period of time has passed since a respective memory command of the plurality of commands are received. The control unit 212 can be configured to abort the host access transaction in response to performance of a memory operation corresponding to the respective memory command not being completed within the particular period of time. Further, in this example, the access controller 110, 210 can further include a timer (e.g., the OTT 232 illustrated in FIG. 2) that indicates whether a particular period of time has passed since a first memory 104, 304 command of the host access transaction is received. The control unit 212 can be configured to abort the host access transaction in response to performance of memory operations corresponding to the plurality of memory commands not being completed within the particular period of time.

In another non-limiting example, a system can include an access controller (e.g., the access controller 110 and/or 210 illustrated in FIGS. 1 and 2, respectively) that includes a first memory (e.g., the LMA 224 and/or 324 illustrated in FIGS. 2 and 3, respectively). The system can further include a second memory (e.g., the memory 104 and/or 304 illustrated in FIGS. 1 and 3, respectively) communicatively coupled the access controller 110, 210. The access controller 110, 210 can be configured to receive a plurality of memory commands to perform a plurality of respective memory operation on the second memory 104, 304. The plurality of memory commands can correspond to a first host access transaction. The access controller 110, 210 can be configured to prevent, to regulate access of the second memory 104, 304, one or more memory commands of the plurality from being executed based on a number of memory operations performed on the second memory 104, 304 over a particular period of time and an amount of time taken for executing a respective memory command of the plurality of memory commands.

In some embodiments, the access controller 110, 210 can be configured to encrypt data prior to writing the data to the second memory 104, 304 and decrypt data prior to reading the data from the second memory 104, 304 to the first memory 224, 324.

In some embodiments, the access controller 110, 210 can be configured to copy data stored in the second memory 104, 304 to the first memory 224, 324 in response to a power cycling event (e.g., reset) of the access controller 110, 210. In this example, the plurality of memory commands can be received subsequent to the copy of the data from the second memory 104, 304 to the first memory 224, 324. The access controller 110, 210 can be configured to access data corresponding to the plurality of memory commands from the first memory 224, 324 instead of the second memory 104, 304 subsequent to the copy of the data from the second memory 104, 304 to the first memory 224, 324.

In some embodiments, the first memory 224, 324 configured to store data corresponding to one or more host access transactions. The access controller 110, 210 can further include a respective set of flags (e.g., the flags 344 illustrated in FIG. 3) for data corresponding to each host access transaction, wherein the respective set of flags are indicative of whether access of the data corresponding to each host access transaction is granted or not.

Continuing with this example, each set of flags 344 can include a first flag of the set indicative whether a read access to data (e.g., a respective "word" as organized in LMM 220 illustrated in FIG. 2) corresponding to a respective host access transaction is granted, a second flag of the set indicative whether a write access to data (e.g., a respective "word" as organized in LMM 220 illustrated in FIG. 2) corresponding to the respective host access transaction is granted, a third flag of the set indicative whether a host access to data (e.g., a respective "word" as organized in LMM 220 illustrated in FIG. 2) corresponding to the respective host access transaction is temporarily prevented, and a fourth flag of the set indicative whether a host access to data (e.g., a respective "word" as organized in LMM 220 illustrated in FIG. 2) corresponding to the respective host access transaction is permanently prevented. Further continuing with this example, each set of flags 344 further can include a flag indicative of whether one or more errors were detected during a decryption of data corresponding to a respective host access transaction. Further continuing with this example, the access controller 110, 210 can further include a respective counter (e.g., the counter 344 illustrated in FIG. 3) for data corresponding to each host access transaction and that is indicative of a number of memory operations performed on the data. The access controller 110, 210 can be configured to reset at least one of the respective counters in response to a power cycling event (e.g., reset) of the access controller 110, 210.

Figure 4:
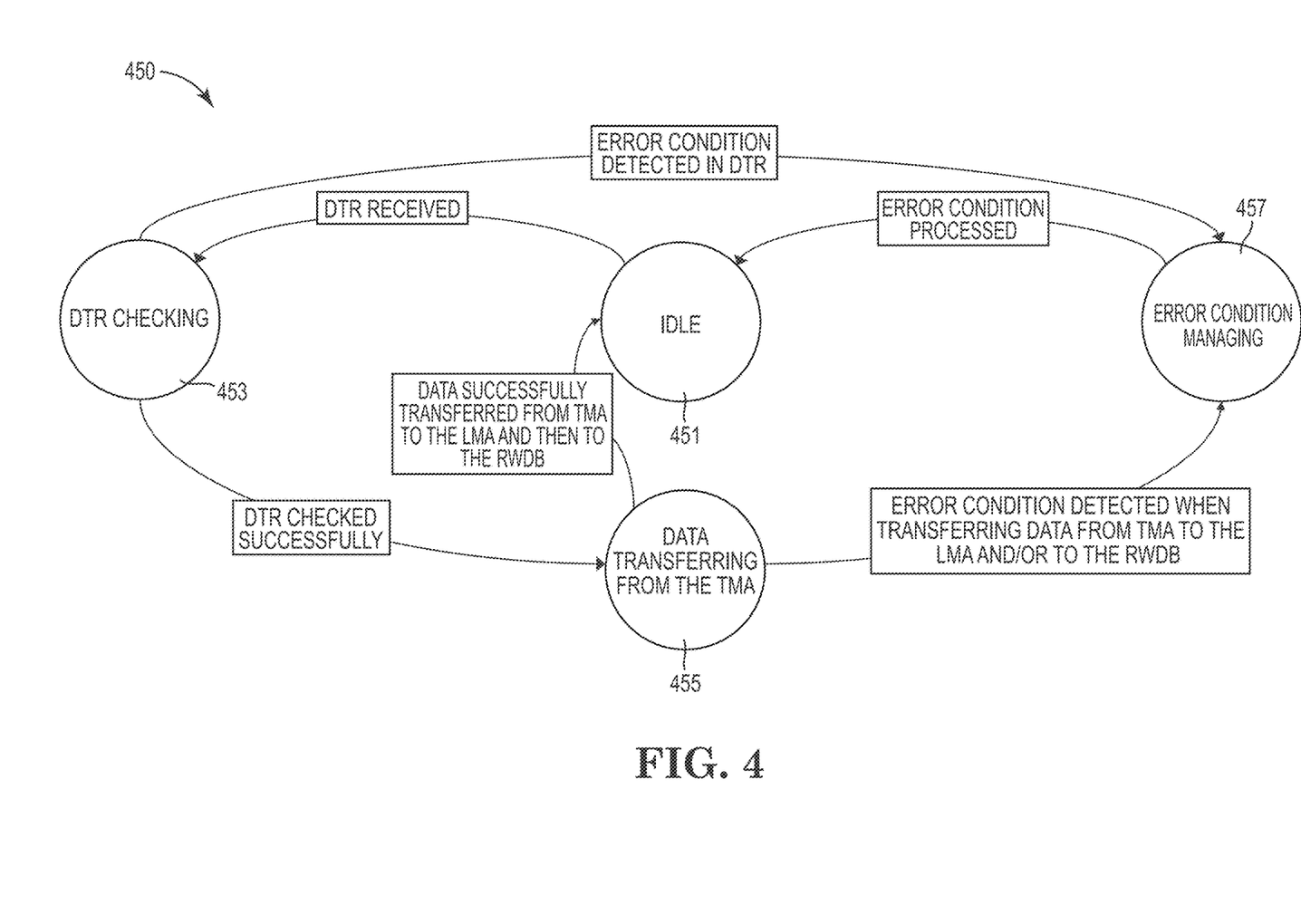
FIG. 4 is a flow diagram illustrating how a read command is executed in accordance with a number of embodiments of the present disclosure.

FIG. 4 is a flow diagram 450 illustrating how a read command is executed in accordance with a number of embodiments of the present disclosure. Although embodiments are not so limited, a flow diagram 450 can correspond to a finite state machine (FSM).

An access controller (e.g., the access controller 110 and/or 210 illustrated in FIGS. 1 and 2, respectively) can be in an "idle" state 451 (as indicated by the status register 216 illustrated in FIG. 2), which indicates that the access controller is currently not executing a memory command and available for executing a subsequent memory command. At 453, once a read command is received at the access controller (e.g., at the control register 214 illustrated in FIG. 2), the access controller checks (e.g., the control register 214 illustrated in FIG. 2) to confirm receipt of the read command. If the receipt is confirmed, the flow diagram 450 proceeds to 455 to execute the read command. If the receipt is not confirmed and/or an error condition is detected with the read command, the flow diagram 450 proceeds to 457. At 457, the abnormal status (e.g., that the receipt is not confirmed and/or the error condition is detected) associate with the read command can be reported to the host via the status register 216.

At 455, the read command is executed to transfer (e.g., read and/or copy) data corresponding to the read command from the TMA (e.g., the TMA 104 illustrated in FIG. 1) to the LMA (LMA 224 illustrated in FIG. 2). If the data is successfully transferred (e.g., data are successfully written to the LMA without a decryption of the data detecting an error), the flow diagram 450 proceeds back to 451, in which the access controller is put into an "idle" state again, which indicates that the access controller is available for executing another memory command. If the transfer was unsuccessful (e.g., if the decryption detected an error in the data), the flow diagram 450 proceeds to 457, at which the unsuccessful transfer can be reported to the host via the status register 216.

Figure 5:
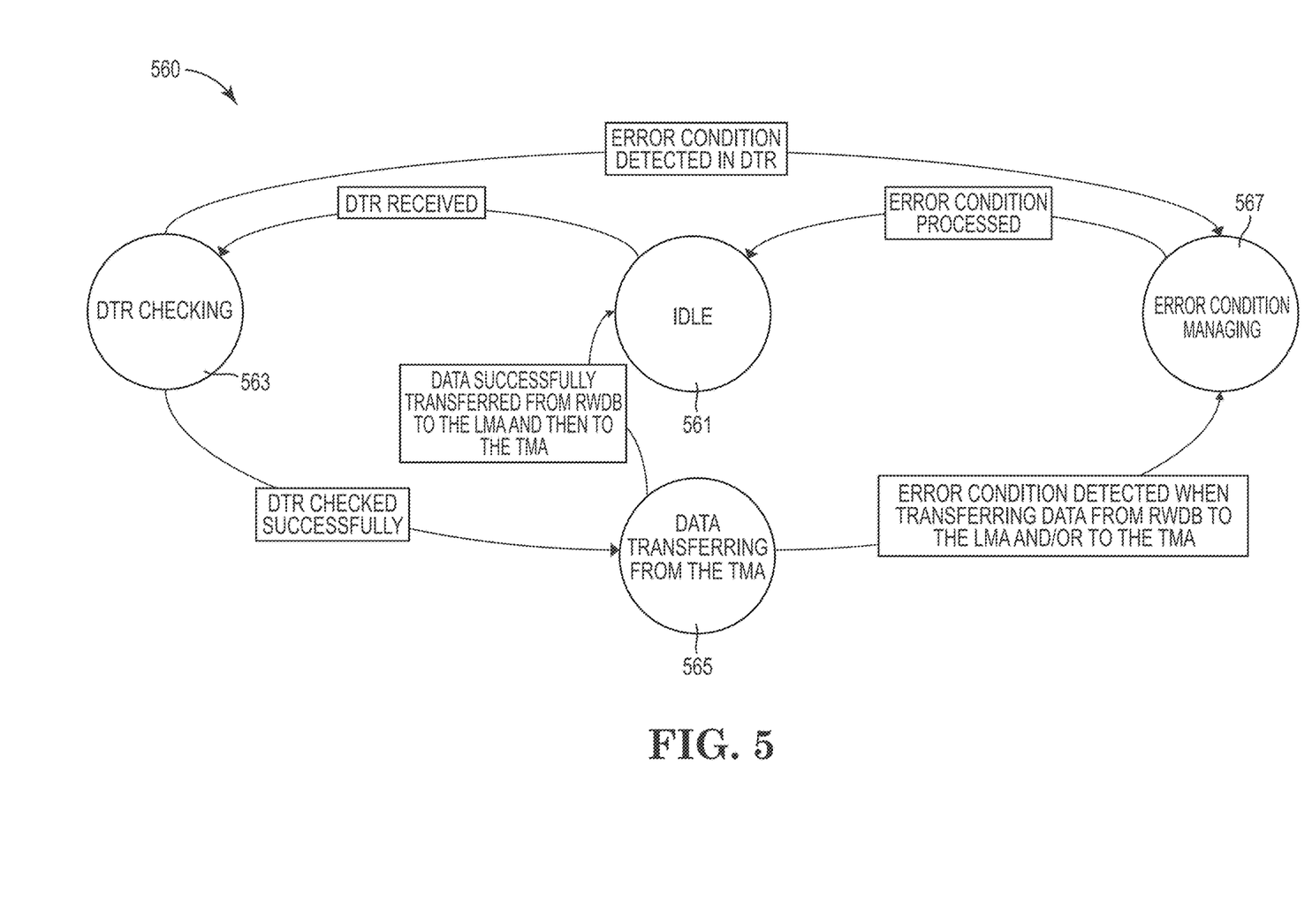
FIG. 5 is a flow diagram illustrating how a write command is executed in accordance with a number of embodiments of the present disclosure.

FIG. 5 is a flow diagram 560 illustrating how a write command is executed in accordance with a number of embodiments of the present disclosure. Although embodiments are not so limited, a flow diagram 560 can correspond to a FSM.

An access controller (e.g., the access controller 110 and/or 210 illustrated in FIGS. 1 and 2, respectively) can be in an "idle" state 561 (as indicated by the status register 216 illustrated in FIG. 2), which indicates that the access controller is currently not executing a memory command and available for executing a subsequent memory command. At 563, once a write command is received at the access controller (e.g., at the control register 214 illustrated in FIG. 2), the access controller checks (e.g., the control register 214 illustrated in FIG. 2) to confirm receipt of the write command. If the receipt is confirmed, the flow diagram 560 proceeds to 565 to execute the write command. If the receipt is not confirmed and/or an error condition is detected with the write command, the flow diagram 560 proceeds to 567. At 567, the abnormal status (e.g., that the receipt is not confirmed and/or the error condition is detected) associate with the write command can be reported to the host via the status register 216.

At 565, the write command is executed to transfer (e.g., write) data corresponding to the write command to the TMA (e.g., the TMA 104 illustrated in FIG. 1). If the data is successfully transferred (e.g., data are successfully written to the TMA with the data being successfully encrypted), the flow diagram 560 proceeds back to 561, in which the access controller is put into an "idle" state again, which indicates that the access controller is available for executing another memory command. If the transfer was unsuccessful (e.g., if the encryption was unsuccessful), the flow diagram 560 proceeds to 567, at which the unsuccessful transfer can be reported to the host via the status register 216.

An example pseudocode associated with regulating access to an intermediate memory (e.g., executing a read command as illustrated in FIG. 4 and a write command as illustrated in FIG. 5 on the intermediate memory 104 illustrated in FIG. 1) can include:

```
dtr_checking( )¹
{
 /*
 * variables qualified as static keep their value between calls of
 * the function dtr_checking( )
 */
 static first_time_called = TRUE;
 static n_of_DTR_to_be_processed;
 static n_of_DTR_processed;
 static first_DTR;
 static RT_splitted_in_many_DTRs;
 static LMM_word_address;
 /*
 * by design default value of the error code_variable is NOT something
 * like NO_ERR
 */
 error_code = UNDEFINED_ERR;
 /*
 * the following code section initialize the static variables and
 * reset timers
 */
 if (first_time_called)
   {
   n_of_DTR_processed = 0;
   n_of_DTR_to_be_processed =
   read_amount_of_data_from_CR( );
   if (n_of_DTR_to_be_processed == 0)
     {
     /* invalid amount of data to be transferred */
     error_code = ERR_SIZE_0;
     goto error_management;
     }
   else if (n_of_DTR_to_be_processed > max_allowed_DTR)
     {
     /* invalid amount of data to be transferred */
     error_code = ERR_SIZE_1;
     goto error_management;
     }
   else if (n_of_DTR_to_be_processed == 1)
     /* a single DTR is used to carry out the current RT/WT */
     RT_splitted_in_many_DTRs = FALSE;
   else
     /* several DTRs are used to carry out the current RT/WT */
     RT_splitted_in_many_DTRs = TRUE;
   /*
   * determine the type of the current data transfer: RT (Read
   * Transaction) or WT (Write Transaction)
   */
   type_of_data_transfer =
   read_type_of_data_transfer_from_CR( );
   /* read the address of the LMM word to which the current DTR
   belongs */
   LMM_word_address = read_address_from_CR( );
   /*
   * the following code section implements the check of the access
   * permission flags of the LMM word to which the current DTR
   * belongs
   */
   flag_R = read_LMM_R_flag(LMM_word_address);
   flag_W = read_LMM_W_flag(LMM_word_address);
   flag_L = read_LMM_L_flag(LMM_word_address);
   flag_P = read_LMM P_flag(LMM_word_address);
   if (flag_P == FLAG_ASSERTED)
     {
     error_code = ERR_PERMANENTLY_DISABLED;
     goto error_management;
     }
   if (flag_L == FLAG_ASSERTED)
     {
     error_code = ERR_LOCKED;
     goto error_management;
     }
   if (type_of_data_transfer == RT)
     {
     if (flag_R == FLAG_DEASSERTED)
       {
       error_code = ERR_READ_NOT_ALLOWED;
```

-continued

```
       goto error_management;
       }
     }
   else /* WT */
     {
     if (flag_W == FLAG_DEASSERTED)
       {
       error_code = ERR_WRITE_NOT_ALLOWED;
       goto error_management;
       }
     }
   /*
   * the following code section implements the check of the access
   * valid flag of the LMM word to which the current DTR
   * belongs
   */
   flag_V = read_LMM_V_flag(LMM_word_address);
   if (flag_V == FLAG_DEASSERTED)
     {
     error_code = ERR_NOT_VALID;
     goto error_management;
     }
   /* reset timers */
   reset_IDTT( );
   if (RT_splitted_in_many_DTRs == TRUE) reset_OTT( );
   /* this prevent execution of the code segment above at the next call
   */
   first_time_called = FALSE;
   }
 /*
 * the following code section establish if the current DTR is the
 * first, the last or an intermediate one
 */
 if (n_of_DTR processed == 0)
   {
   if (n_of_DTR to be processed == 1)
     {
     /* the current DTR is the first and the last one*/
     first_DTR = TRUE;
     last_DTR = TRUE;
     }
   else
     {
     /* the current DTR is the first one */
     first_DTR = TRUE;
     last_DTR = FALSE;
     }
   }
 else if (n_of_DTR_processed == n_of_DTR_to_be_processed − 1)
   {
   /* the current DTR is the last one */
   first_DTR = FALSE;
   last_DTR = TRUE;
   }
 else
   {
   first_DTR = FALSE;
   last_DTR = FALSE;
   }
 /*
 * the following code section implements the checking of the timeout
 * timer
 */
 if (first_DTR == TRUE) /* first DTR of the current RT/WT */
   {
   IDTT_elapsed = 0;
   start_IDTT( );
   if (RT_splitted_in_many_DTRs == TRUE)
     {
     OTT_elapsed = 0;
     start_OTT( );
     }
   }
 else if (last_DTR == TRUE) /* last DTR of the current RT or WT */
   {
   IDTT_elapsed = read_IDTT( );
   if (IDTT_elapsed > max_allowed_IDTT)
     {
     /* IDTT related error condition detected */
     error_code = ERR_IDTT_TIMEOUT_0;
```

```
      goto error_management;
    }
  else
    {
      if (RT_splitted_in_many_DTRs == TRUE)
      {
        OTT_elapsed = read_OTT( );
        if (OTT_elapsed > max_allowed_OTT)
        {
          /* OTT related error condition detected */
          error_code = ERR_OTT_TIMEOUT;
          goto error_management;
        }
        else
          /* no timeout issue found processing the current DTR */
          ;
      }
      else
        /* no timeout issue found processing the current DTR */
        ;
    }
  }
  else /* any other DTR of the current RT or WT */
  {
    IDTT_elapsed = read_IDTT( );
    if (IDTT_elapsed > max_allowed_IDTT)
    {
      /* IDTT related error condition detected */
      error_code = ERR_IDTT_TIMEOUT_1;
      goto error_management;
    }
    else
      /* no timeout issue found processing the current DTR */
      reset_IDTT( );
  }
  if (last DTR == TRUE)
    {
      /*
      * all the DTRs of the current RT/WT have been successfully
      * processed
      */
      first_time_called = FALSE;
      error_code = NO_ERROR;
      return error_code;
    }
  else
    {
      /* another DTR processed successfully */
      n_of_DTR_processed = n_of_DTR_processed + 1;
    }
  /*
  * an error has been found processing the current DTR, the current
  * RT/WT is aborted
  */
  error_management:
    first_time_called = FALSE;
    return error_code;
};
```

Figure 6:
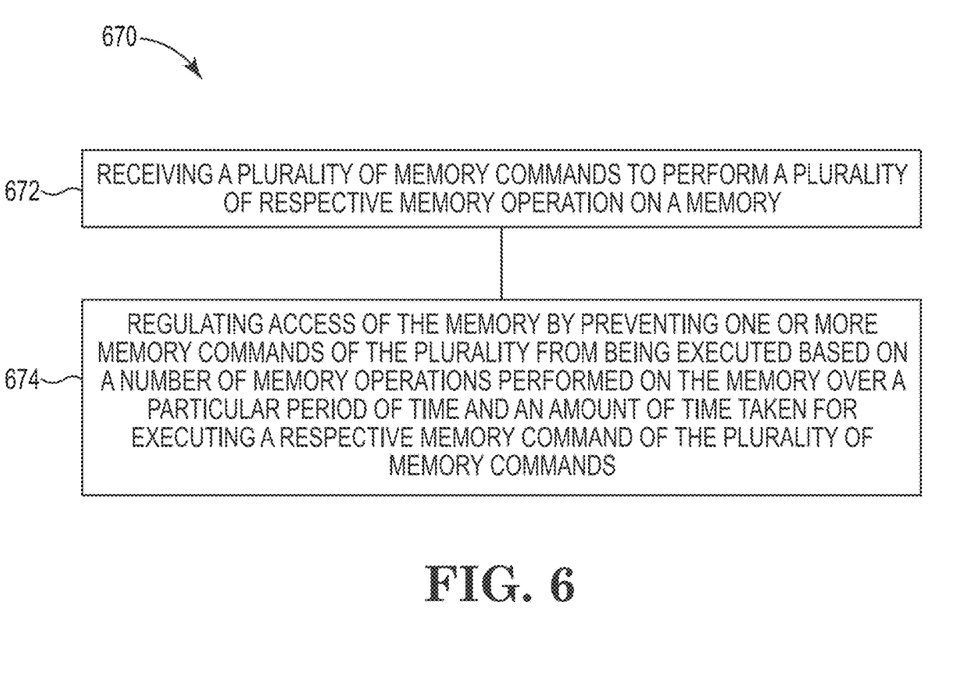
FIG. 6 is a flow diagram of a method for operating an access controller for regulating and securing access to a memory in accordance with a number of embodiments of the present disclosure.

FIG. 6 is a flow diagram of a method 670 for operating an access controller (e.g., the access controller 110 and/or 210 illustrated in FIGS. 1 and 2, respectively) for regulating and securing access to a memory (e.g., the memory 104 illustrated in FIG. 1) in accordance with a number of embodiments of the present disclosure. The methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 672, a plurality of memory commands can be received to perform a plurality of respective memory operation on a memory (e.g., the intermediate memory 104 and/or 304 illustrated in FIGS. 1 and 3, respectively). The plurality of memory commands correspond to at least one host access transaction.

At 674, access of the memory can be regulated by preventing one or more memory commands of the plurality from being executed based on a number of memory operations performed on the memory 104 over a particular period of time and an amount of time taken for executing a respective memory command of the plurality of memory commands.

In some embodiments, at least one of the plurality of memory commands corresponds to a write command. In this example, the write command can be executed by encrypting data corresponding to the write command to store the data in the memory in cypher text form and writing the encrypted data to the memory.

In some embodiments, at least one of the plurality of memory commands corresponds to a read command. In this example, the read command can be executed by reading data that has been stored in the memory in cypher text form and decrypting the data read from the memory 104 to make the data available to the host in plain text form.

In some embodiments, the one or more memory commands of the plurality can be prevented from being executed responsive to a number of memory operations performed on the memory 104 over the particular period of time meeting a criterion (e.g., exceeding a threshold quantity of memory operations). In some embodiments, the one or more memory commands of the plurality can be prevented from being executed responsive to an amount of time taken for executing the respective memory command meeting a criterion (e.g., exceeding a threshold amount of time). In some embodiments, the one or more memory commands of the plurality can be prevented from being executed responsive to an amount of time elapsed upon receipt of a first memory command of the plurality of memory commands meeting a criterion (e.g., exceeding a threshold amount of time prior to receipt of a last memory command of the plurality of memory commands).

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
copying data stored in a first memory to a second memory;
receiving a plurality of memory commands to perform a plurality of memory operations on the first memory, wherein the plurality of memory commands correspond to at least one host access transaction;
accessing at least a portion of the data corresponding to the plurality of memory commands from the second memory instead of the first memory subsequent to the copy of the data from the first memory to the second memory; and
regulating access of the first memory by preventing one or more memory commands of the plurality of memory commands from being executed based on:
a number of memory operations performed on the first memory over a particular period of time; and
an amount of time taken for executing a respective memory command of the plurality of memory commands.

2. The method of claim 1, wherein at least one of the plurality of memory commands corresponds to a write command, and wherein the method further comprises executing the write command by:
encrypting data corresponding to the write command to store the data in the first memory in cypher text form; and
writing the encrypted data to the first memory.

3. The method of claim 1, wherein at least one of the plurality of memory commands corresponds to a read command, and wherein the method further comprises executing the read command by:
reading data from the first memory, wherein the data is stored in the first memory in cypher text form; and
decrypting the data read from the first memory to make the data available to the host in plain text form.

4. The method of claim 1, wherein regulating access of the first memory by preventing the one or more memory commands of the plurality of memory commands from being executed further comprises preventing the one or more memory commands of the plurality of memory commands from being executed responsive to the number of memory operations performed on the first memory over the particular period of time meeting a criterion.

5. The method of claim 1, wherein regulating access of the first memory by preventing the one or more memory commands of the plurality of memory commands from being executed further comprises preventing the one or more memory commands of the plurality of memory commands from being executed responsive to the amount of time taken for executing the respective memory command meeting a criterion.

6. The method of claim 1, further comprising regulating access of the first memory by preventing the one or more memory commands of the plurality of memory commands from being executed responsive to an amount of time elapsed upon receipt of a first memory command of the plurality of memory commands meeting a criterion.

7. An apparatus, comprising:
an access controller communicatively coupled to a first memory, the access controller further comprising a second memory, wherein the access controller is configured to regulate access of the first memory based on:
a number of memory operations performed on the first memory over a particular period of time; and
an amount of time taken for performance of one or more memory operations on the first memory;
wherein the second memory configured to store data corresponding to one or more host access transactions, and wherein the second memory further comprises:
a first flag indicative whether a read access to data corresponding to a respective host access transaction is granted;
a second flag indicative whether a write access to data corresponding to the respective host access transaction is granted;
a third flag indicative whether a host access to data corresponding to the respective host access transaction is temporarily prevented on a respective location; and
a fourth flag indicative whether the host access to the data corresponding to the respective host access transaction is permanently prevented on a respective location.

8. The apparatus of claim 7, wherein the access controller further comprises a cryptographic engine and a second memory coupled to the first memory;
wherein the access controller is configured to:
transfer the data from the second memory to the cryptographic engine to encrypt the data; and
write the encrypted data to the first memory.

9. The apparatus of claim 8, wherein the access controller is configured to:
cause the first memory to transfer data that has been stored in the first memory in an encrypted version to the cryptographic engine to decrypt the data; and
write the decrypted data to the second memory to make the data available to a host in an unencrypted version.

10. The apparatus of claim 7, wherein the access controller is configured to receive a plurality of memory commands respectively corresponding to a plurality of memory operations that correspond to a host access transaction.

11. The apparatus of claim 10, wherein the access controller further comprises a timer that indicates whether a first particular period of time has passed since a respective memory command of the plurality of commands is received, wherein:
the access controller is configured to abort the host access transaction in response to performance of a memory operation corresponding to the respective memory command not being completed within the first particular period of time.

12. The apparatus of claim 10, wherein the access controller further comprises a timer that indicates whether a second particular period of time has passed since a first memory command of the host access transaction is received, wherein:
the access controller is configured to abort the host access transaction in response to performance of memory operations corresponding to the plurality of memory commands not being completed within the second particular period of time.

13. A system, comprising:
an access controller comprising a first memory; and
a second memory coupled to the access controller, wherein the access controller is configured to:
  copy data stored in the second memory to the first memory in response to a power cycling event involving the access controller;
  receive, subsequent to the copy of the data from the second memory to the first memory, a plurality of memory commands to perform a plurality of respective memory operations on the second memory, wherein the plurality of memory commands corresponds to a first host access transaction;
  access at least a portion of the data corresponding to the plurality of memory commands from the first memory instead of the second memory subsequent to the copy of the data from the second memory to the first memory; and
  prevent, to regulate access of the second memory, one or more memory commands of the plurality of memory commands from being executed based on:
    a number of memory operations performed on the second memory over a particular period of time; and
    an amount of time taken for executing a respective memory command of the plurality of memory commands.

14. The system of claim 13, wherein the access controller is configured to:
  encrypt data prior to writing the data to the second memory; and
  decrypt the data prior to reading the data from the second memory to the first memory.

15. The system of claim 13, wherein:
  the first memory configured to store data corresponding to one or more host access transactions; and
  the access controller further includes a respective set of flags for the data corresponding to each host access transaction, wherein the respective set of flags are indicative of whether access of the data corresponding to each host access transaction is granted or not.

16. The system of claim 15, wherein each set of flags comprises:
  a first flag of the set indicative whether a read access to the data corresponding to a respective host access transaction of the one or more host access transactions is granted;
  a second flag of the set indicative whether a write access to the data corresponding to the respective host access transaction is granted;
  a third flag of the set indicative whether a host access to the data corresponding to the respective host access transaction is temporarily prevented on a respective location; and
  a fourth flag of the set indicative whether a host access to the data corresponding to the respective host access transaction is permanently prevented on a respective location.

17. The system of claim 15, wherein each set of flags further comprises a flag indicative of whether one or more errors were detected during a decryption of the data corresponding to a respective host access transaction of the one or more host access transactions.

18. The system of claim 15, wherein the access controller further comprises respective counters for the data corresponding to each host access transaction and that is indicative of a number of memory operations performed on the data.

* * * * *